April 14, 1936.  R. BERINGER  2,037,451

DISK CLUTCH

Filed Jan. 8, 1934  2 Sheets-Sheet 1

Inventor
Roscoe Beringer
By Blackmore, Spencer & Flint
Attorneys

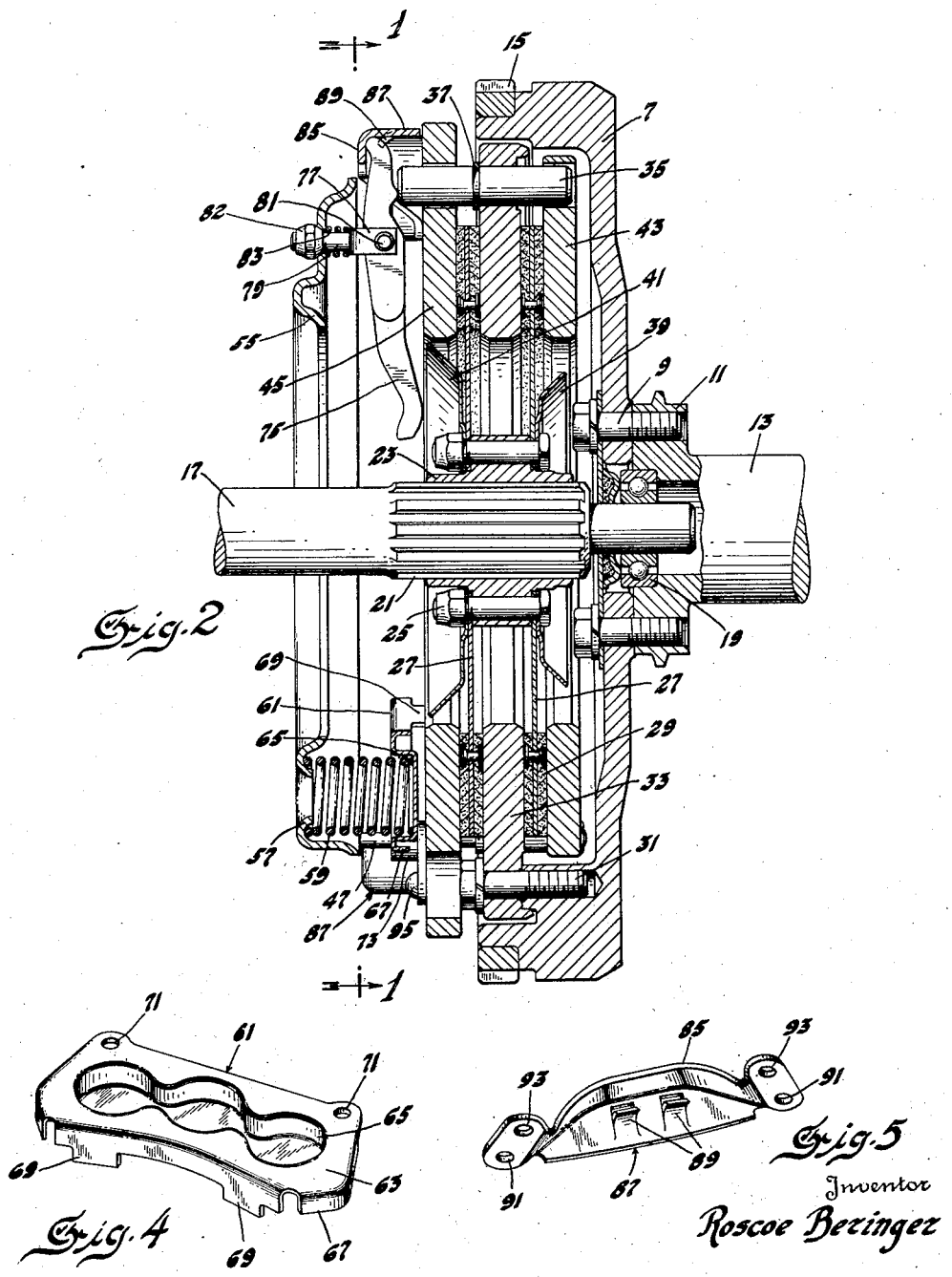

Patented Apr. 14, 1936

2,037,451

UNITED STATES PATENT OFFICE 2,037,451

DISK CLUTCH

Roscoe Beringer, Detroit, Mich., assignor to General Motors Corporation, Detroit, Mich., a corporation of Delaware Application January 8, 1934, Serial No. 705,658

2 Claims. (Cl. 192—69)

This invention relates to friction clutches and has been designed as an improvement in the clutch for connecting the power plant and transmission mechanism of a motor vehicle.

More particularly the invention relates to a clutch of the kind shown in the patent to Thompson 1,768,346 for a Disk clutch, granted June 24, 1930 and in the patent to Seaholm 1,874,366 for a Clutch, granted August 30, 1932, both said patents being assigned to the assignee of this application.

An object of the invention is to improve the operation of such a clutch, and to reduce the cost of manufacture.

Other objects and advantages will be understood from the following description.

In the drawings accompanying the description:

Fig. 2 is a section on line 2—2 of Fig. 1.

Fig. 4 and Fig. 5 are views in perspective of certain parts employed in the assembly.

Figure 1:
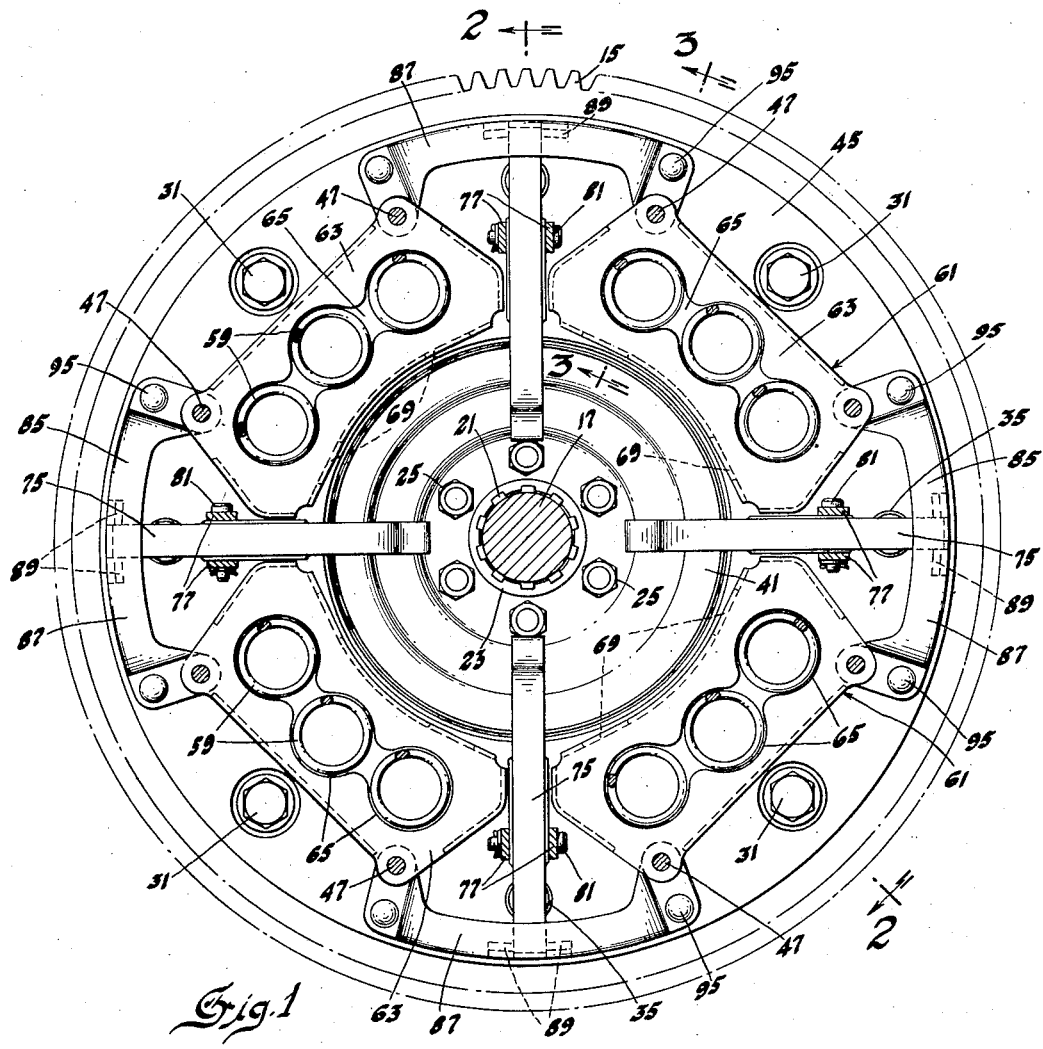
Fig. 1 is a view in elevation as seen from line 1—1 of Fig. 2.

Referring by reference characters to the drawings, numeral 7 is a flywheel secured by fastening means 9 to flange 11 of the engine shaft 13. The flywheel carries a ring gear 15 by which, through the starter pinion, not shown, the engine may be started. At 17 is a driven or transmission shaft having a bearing 19 in the recessed end of shaft 13. Splines 21 on the driven shaft carry a hub 23 to which is secured, by fastening means 25 and in spaced relation to each other, driven disks 27 provided on opposite sides thereof with friction rings 29.

Securing means 31 are employed to attach immovably to the flywheel an intermediate driving disk 33. Fulcrum pins 35 are press-fitted into the disk 33 and are further held by a ring 37 in a groove of the fulcrum pin and engaging the face of disk 33. Oil guards 39 and 41 are employed to keep bearing oil from the friction surfaces. Other driving disks 43 and 45 are axially slidable on pins 35 and are held by these pins from rotation relative to the disk 33 and the flywheel.

Figure 3:
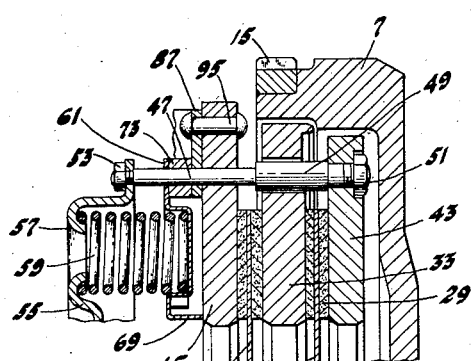
Fig. 3 is a section on line 3—3 of Fig. 1.

Studs 47 (see Fig. 1 and Fig. 3) are located in pairs on opposite sides of the fulcrum pins. These studs have enlarged regions 49 slidable through driving disk 33 and engaging disk 43. On each stud a nut 51 cooperates with the end of the enlargement to hold the plate 43 rigid with the stud. The studs slide through plate 45. At the ends of the studs are fastening means 53 to secure an annular ring 55 to their ends. This ring 55 has indented portions 57 in groups of three distributed around the ring to serve as abutments for springs 59.

In previous designs the opposite ends of these springs 59 were arranged in direct abutment with the equivalent of plate or disk 45. In the region of contact with the springs the disk has tended to deflect and the metal to flow as the result of the localized pressures. To avoid serious deflection the disks have been made thicker than would otherwise have been necessary. To overcome this tendency to deflection and also to permit the use of thinner plates and thereby effect a material saving of material and to reduce the inertia of the rotating mass when the clutch is disconnected, there have been provided spring abutment plates 61. Each plate has in its surface 63 recesses 65 to receive the springs. It has a side wall 67 from which tongues 69 project to an extent greater than the depth of recesses 65. On the edge of the surface 63 remote from the tongues are apertures 71. Suitable apertured spacers 73 are placed between the plate 61 and the disk 45. The studs 47 extend through the apertures 71 and the spacers whereby the plates 61 are held in position. The spring pressure is transmitted to the disk at the points of engagement of tongues 69 and spacers 73 and thereby distributed over a wider area than heretofore. By this means deflection is avoided and disks of lesser thickness may be employed.

The clutch is released by the rocking of releasing levers or fingers 75. The actuating means which rocks the levers may be of any kind desired. Each lever is pivoted on a pin 81 mounted in a yoke 77 carried by a stem 79. The stem 79 projects through an opening in ring 55 and a nut 82 holds it from movement through the ring. Preferably a noise-preventing spring 83 surrounds the stem 79 and engages a shoulder thereof and the plate 55. The end of the lever engages a flange 85 turned down from a stamping 87. The stamping has tongues 89 between which the lever end extends and by which it is guided. At its ends each stamping 87 has apertures 91 and 93, the former used for engagement of fastening means such as rivets 95, the latter 93 intended to register with openings 71 and receive slidably the studs 47.

By the construction described the springs 59 effect the movement of disks 43 and 45 toward the plate 33 to thereby grip the driven plates 27. Rocking of levers or fingers 75 (counterclockwise as seen in Fig. 2) on their points of engagement with pins 35 pushes disk 45 away from the fixed disk 33 by the engagement of the finger ends on stamping 87. At the same time the ring 55 is pulled inwardly by the stems 79 and nuts 82. This movement of ring 55 pushes driving disc 43 away from disk 33 by means of the studs 47. The distribution of the spring pressure makes possible reduction of thickness of the driving disks, a consequent reduction in the inertia of the rotating means when the clutch is released, and a saving in cost.

I claim:

1. In a friction clutch, a first driving member, movable driving members one on each side of the first driving member, a driven member between the first driving member and each of said movable driving members, a spring abutment ring, means fixedly secured to the spring abutment ring and the remotely located movable driving member, said means being slidably mounted in the near movable driving member and the first driving member, a spring abutment plate engaging said near movable driving member at points outside the region of the spring abutment to avoid localized pressure and deflection, and springs engaging said ring and said abutment plate.

2. In a friction clutch, a first driving member, a second driving member movable toward and from the first, a driven member to be frictionally engaged between said driving members, a plurality of plates lying wholly on the side of the second driving member remote from the driven member, said plates arranged in circumferential relation and each being in contact at its periphery only with said second driving member, yielding means engaging each plate on the side thereof remote from the second driving member and inwardly of the marginal portion of said plate, and an opposed abutment for said yielding means.

ROSCOE BERINGER.